United States Patent
Dark et al.

(10) Patent No.: US 6,243,329 B1
(45) Date of Patent: Jun. 5, 2001

(54) METHOD OF ENHANCED COMPRESSION RATE FOR A MULTI-DISC CD PLAYER

(75) Inventors: Jay P. Dark, Canton; Husein Taljanovic, Ann Arbor; Ylldes Zeneli, Dearborn Heights, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/226,358

(22) Filed: Jan. 6, 1999

(51) Int. Cl.[7] .................................................... G11B 17/22
(52) U.S. Cl. ...................... 369/32; 369/53.41; 369/47.32
(58) Field of Search ................................... 369/30, 32, 33, 369/34, 47, 48, 53, 54, 58, 124.06

(56) References Cited

U.S. PATENT DOCUMENTS

| | | |
|---|---|---|
| 3,997,913 | 12/1976 | Rittenbach . |
| 4,053,712 | 10/1977 | Reindl . |
| 4,110,560 | 8/1978 | Leary et al. . |
| 4,603,412 | 7/1986 | Yamazaki . |
| 4,627,090 | 12/1986 | Smith, III et al. . |
| 4,805,217 | 2/1989 | Morihiro et al. . |
| 4,839,923 | 6/1989 | Kotzin . |
| 4,860,272 | 8/1989 | Nishikawa et al. . |
| 4,916,742 | 4/1990 | Kolesmikov et al. . |
| 4,944,012 | 7/1990 | Morio et al. . |
| 5,148,417 | 9/1992 | Wong et al. . |
| 5,157,728 | 10/1992 | Schorman et al. . |
| 5,187,697 | 2/1993 | Muramatsu et al. . |
| 5,357,595 | 10/1994 | Sudoh et al. . |
| 5,471,442 | 11/1995 | Shimizume . |
| 5,611,018 | 3/1997 | Tanaka et al. . |

*Primary Examiner*—Paul W. Huber
(74) *Attorney, Agent, or Firm*—Mark Mollon

(57) ABSTRACT

A method of enhanced compression rate for a multi-disc CD player includes the step of determining a last data position on a CD being played by the CD player. The method also includes the steps of determining a last playable data position and whether the last playable data position is being played. The method further includes the steps of storing data in a buffer memory at a compressed rate if the last playable data position is being played and playing the data from the buffer memory while transitioning to a next CD to be played.

10 Claims, 1 Drawing Sheet

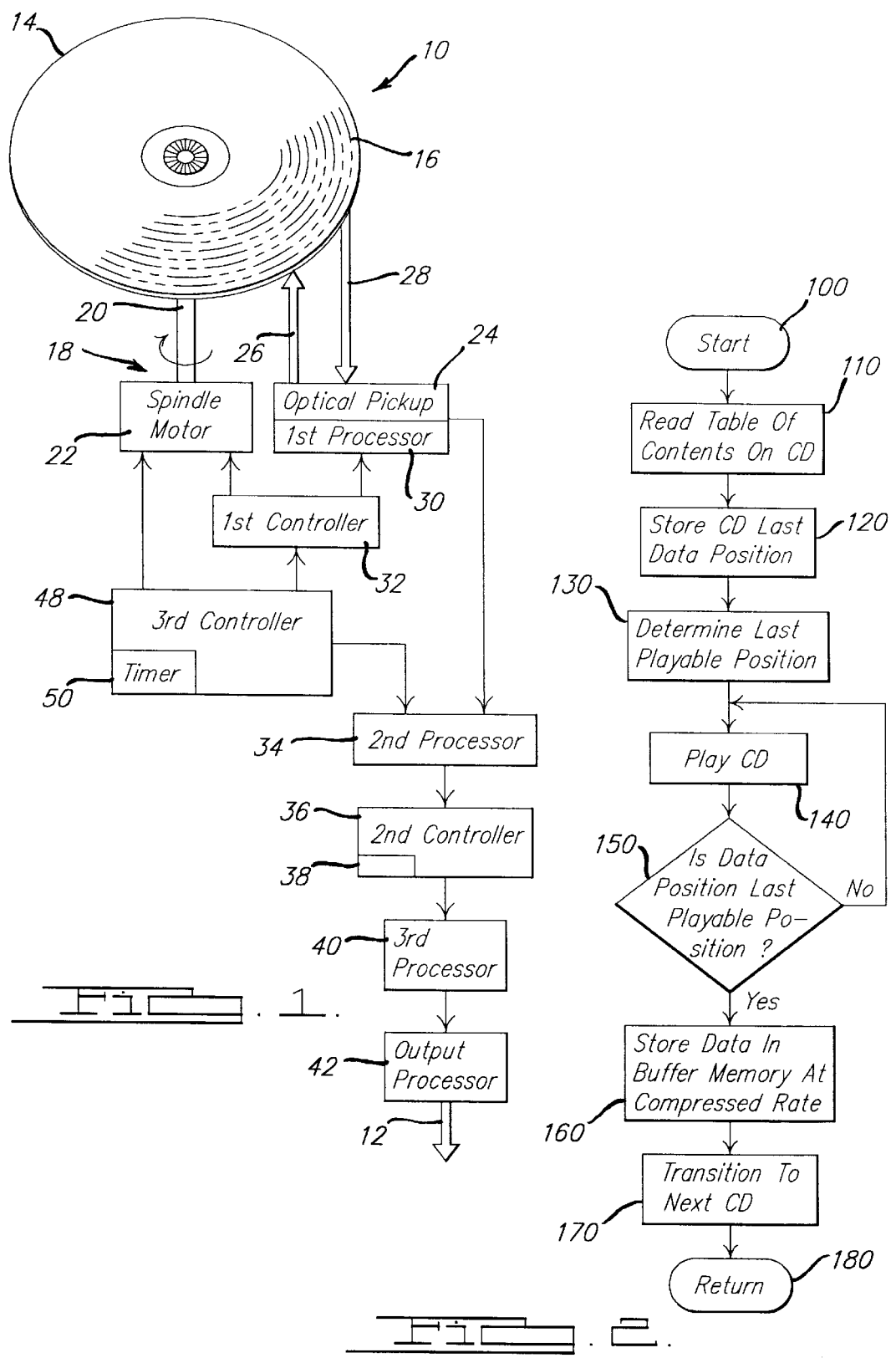

METHOD OF ENHANCED COMPRESSION RATE FOR A MULTI-DISC CD PLAYER

BACKGROUND OF THE INVENTION

1. Field of the Invention

The present invention relates generally to compact disc players and, more specifically, to a method of enhanced compression rate for a multi-disc compact disc player.

2. Description of the Related Art

Recorded media is now generally available in a newer format of a digitally encoded optical disc. An audio disc is commonly referred to as a compact disc (CD). Similarly, a player of a compact disc is referred to as a CD player. The CD player reproduces an audio signal from the digital data stored on the CD, as is well understood in the art. The increasing popularity of CD players in recent years has expanded their use as an audio component on a vehicle, and in particular, a motor vehicle.

Multi-disc CD players are capable of storing a plurality of CDs for selection and playback. A disadvantage of a multi-disc CD player is an extended period of no audio play that occurs when the CD player is changing discs, which could be as great as twelve (12) seconds. Human factor studies indicate that listeners are dissatisfied with extended periods of no audio play by the CD player and would prefer that periods of no audio play be minimized. Thus, there is a need in the art for a method of enhanced compression rate for a multi-disc CD player to reduce periods of no audio play during disc changes.

SUMMARY OF THE INVENTION

Accordingly, the present invention is a method of enhanced compression rate for a multi-disc CD player. The method includes the steps of determining a last data position on a CD being played by the CD player. The method also includes the steps of determining a last playable data position and whether the last playable data position is being played. The method further includes the steps of storing data in a buffer memory at a compressed rate if the last playable data position is being played and playing the data from the buffer memory while transitioning to a next CD to be played.

One advantage of the present invention is that a method of enhanced compression rate for a multi-disc CD player is provided that modifies a data sampling rate to a compressed data sampling rate if the end of the CD is detected. Another advantage of the present invention is that the compressed data sampling rate increases the amount of data that can be stored in a buffer memory. Still another advantage of the present invention is that the enhanced buffer memory allows for the buffer memory to play while the CD player is transitioning to another disc.

Other features and advantages of the present invention will be readily appreciated, as the same becomes better understood after reading the subsequent description when considered in connection with the accompanying drawings.

BRIEF DESCRIPTION OF THE DRAWINGS

FIG. 1 is a block diagram of a CD player, for carrying out a method according to the present invention.

FIG. 2 is a block diagram of a method of enhanced compression rate, according to the present invention, for the CD player of FIG. 1.

DESCRIPTION OF THE PREFERRED EMBODIMENT(S)

Referring to FIG. 1, a block diagram of a compact disc (CD) player 10 is illustrated. The CD player 10 reproduces an audio signal 12 from digital data encoded on an optical disc 14 referred to in the art as a compact disc (CD). The digital data is stored on the CD 14 in the form of pits 16 arranged in a predetermined pattern on a surface of the CD 14. The surface of the CD 14 is mirrored to reflect an optical beam in a manner to be described. It should be appreciated that the CD player 10 is conventional and known in the art.

The CD player 10 includes a spindle mechanism 18. The CD 14 is operatively connected to the spindle mechanism 18 to rotate the CD 14. The spindle mechanism 18 includes a spindle 20 and a motor 22. The CD player 10 also includes an optical pickup 24 that projects a light beam 26 onto a surface of the CD 14 and receives a reflected light beam 28 back that is representative of the digital data encoded on the CD 14. As the spindle mechanism 18 rotatably turns the CD 14 at a predetermined first rate, the optical pickup 24 moves radially across the CD 14 to read digital data from the CD 14. Preferably, the first rate is faster than a typical playing rate. The reflected light beam 28 is converted into an analog audio signal in a manner to be described.

The CD player 10 includes a first processor 30, such as a signal processor, for transforming the reflected light beam signal 28 into an analog signal that is convenient for processing in digital form. The first processor 30 is operatively connected to the optical pickup 24.

The CD player 10 also includes a first controller 32 operatively connected to the spindle mechanism 18 and the optical pickup 24. The first controller 30 operatively maintains a relative position of the CD 14 with respect to the optical pickup 24 and controls the first rate of rotation of the CD 14. Preferably, the first controller 32 includes a servo mechanism as is known in the art.

The CD player 10 includes a second processor 34 for processing the analog signal containing the digital data from the CD 14 into a usable digital signal. The second processor 34 includes an analog to digital signal processor, as is known in the art, to convert the analog signal into a digital data signal.

The CD player 10 also includes second controller 36 for further processing of the digital data signal that is operatively connected to the second processor 34. The second controller 36 includes a random access memory, also referred to as a buffer memory 38. The digital data signal is stored in a discrete data form within the buffer memory 38. The buffer memory 38 is able to accommodate a predetermined amount of data. For example, the buffer memory 38 can store up to three seconds worth of digital data. Preferably, a compression rate at which data is stored in the buffer memory 38 is a faster rate than the rate of playing an audio signal. Therefore, a larger amount of data than necessary can be stored in the buffer memory 38.

The second controller 36 checks the data stored within the buffer memory 38 for a skip and masks out the skip if detected. For example, the second controller 36 can check if each data position is sequential. If the data positions are not sequential, the data position is returned to the data position preceding the nonsequential position to mask out the skip.

The CD player 10 includes a third processor 40, such as a digital to analog signal processor, for converting the digital data into an analog audio signal for subsequent output as an audio signal. The third processor 40 is operably connected to the second controller 36 and retrieves the digital signal from the buffer memory 38 within the second controller 36 at a predetermined second rate. Preferably, the second rate is a typical rate at which the audio signal is played out.

The CD player 10 also includes an output processor 42, such as an amplifier, for playing the analog audio signal 12.

The output processor 42 is operatively connected to the third processor 40. As is known in the art, the output processor 42 separates the analog audio signal 12 into two channels, a right channel and a left channel for play.

The CD player 10 includes a third controller 48 such as a microprocessor. The microprocessor 48 may include a time keeping mechanism or timer 50. The microprocessor 48 communicates with the spindle mechanism 18 to control the rotation of the CD 14. The microprocessor 48 is in communication with the first controller 32 to control the first rate at which the data is being read by the optical pickup 24. The microprocessor 48 further communicates with the second controller 36 to control the compression rate of data being stored in the buffer memory 38 and the second rate at which the data is retrieved from buffer memory 38.

Referring to FIG. 2, flowchart of a method of enhanced compression rate, according to the present invention, for the CD player 10 is illustrated. The method begins in bubble 100, when it is called for periodically from a main control program for the CD player 10 stored within the microprocessor 48. The methodology advances to block 110 and reads a Table of Contents from the CD 14. It should be appreciated that the Table of Contents is positioned at the beginning of the CD 14 and includes information regarding the data encoded on the CD 14 such as a number of tracks, track duration and a last data position.

The methodology advances to block 120 and stores the last data position in a memory location within the microprocessor 48. The methodology advances to block 130 and determines a last playable data position. The last playable data position represents a position at the end of the CD 14, signaling when to start storing data in the buffer memory 38 at a compressed data rate. The last playable data position is determined from the total available buffer memory 38 space and a compressed data rate adjustment factor. The compressed data rate adjustment factor is a ratio representing a predetermined compressed rate of gathering data such as one in four (1:4) data points. The methodology advances to block 140 where the CD player 10 continues to play the CD 14 at a normal rate. The methodology advances to diamond 150.

In diamond 150, the methodology checks if the last playable data position is being played. The methodology returns to block 140 if the last playable data position has not yet been played. If the last playable data position is being played, the methodology advances to block 160. In block 160, the methodology begins storing data in the buffer memory 38 at the compressed rate. The methodology advances to block 170 where the optical pickup 24 and CD 14 are transitioned to the next CD 14 to be played, while the CD player 10 simultaneously plays the compressed data out of the buffer memory 38. The methodology advances to block 180 and returns to the main control program for the CD player 10.

The present invention has been described in an illustrative manner. It is understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of enhanced compression rate for a multi-disc CD player comprising the steps of:
    determining a last data position on a CD being played by the CD player;
    determining a last playable data position;
    checking if the last playable data position is being played;
    storing data in a buffer memory at a compressed rate if the last playable data position is being played; and
    playing the data from the buffer memory while transitioning to a next CD to be played.

2. A method as set forth in claim 1 including a step of reading a Table of Contents from a CD, wherein the Table of Contents includes a last data position on the CD.

3. A method as set forth in claim 1 including a step of continuing to play the CD if the last playable data position is not being played.

4. A method as set forth in claim 1 wherein the last playable data position is determined from a total available buffer memory space and a compressed data rate adjustment factor relative to the last data position.

5. A method as set forth in claim 4 wherein the compressed data rate adjustment factor is a predetermined ratio.

6. A method of enhanced compression rate for a multi-disc CD player comprising the steps of:
    reading a Table of Contents from a CD being played by the CD player;
    finding a last data position from the Table of Contents;
    determining a last playable data position;
    checking if the last playable data position is being played;
    continuing to play the CD if the last playable data position is not being played;
    storing data in a buffer memory at a compressed rate if the last playable data position is being played; and
    playing the data from the buffer memory while transitioning to a next CD to be played.

7. A method as set forth in claim 6 wherein the last playable data position is calculated from a total available buffer memory space and a compressed data rate adjustment factor relative to said last data position.

8. A method as set forth in claim 7 wherein the compressed data rate adjustment factor is a predetermined ratio.

9. A method of enhanced compression rate for a multi-disc CD player comprising the steps of:
    reading a Table of Contents from a CD being played by the CD player;
    finding a last data position from the Table of Contents;
    determining a last playable data position, wherein the last playable data position is calculated from a total available buffer memory space and a compressed data rate adjustment factor, relative to the last data position;
    checking if the last playable data position is being played;
    continuing to play the CD if the last playable data position is not being played;
    storing data in a buffer memory at a compressed rate if the last playable data position is being played; and
    playing the data from the buffer memory while transitioning to a next CD to be played.

10. A method as set forth in claim 9 wherein the compressed data rate adjustment factor is a predetermined ratio.

* * * * *